March 4, 1958

E. F. MAY 2,825,136

SCRIBING INSTRUMENT FOR MAP MAKING

Filed Dec. 30, 1955

INVENTOR
EUGENE F. MAY

BY *H. B. Williams & Co.*

ATTORNEYS

March 4, 1958  E. F. MAY  2,825,136
SCRIBING INSTRUMENT FOR MAP MAKING
Filed Dec. 30, 1955  2 Sheets-Sheet 2
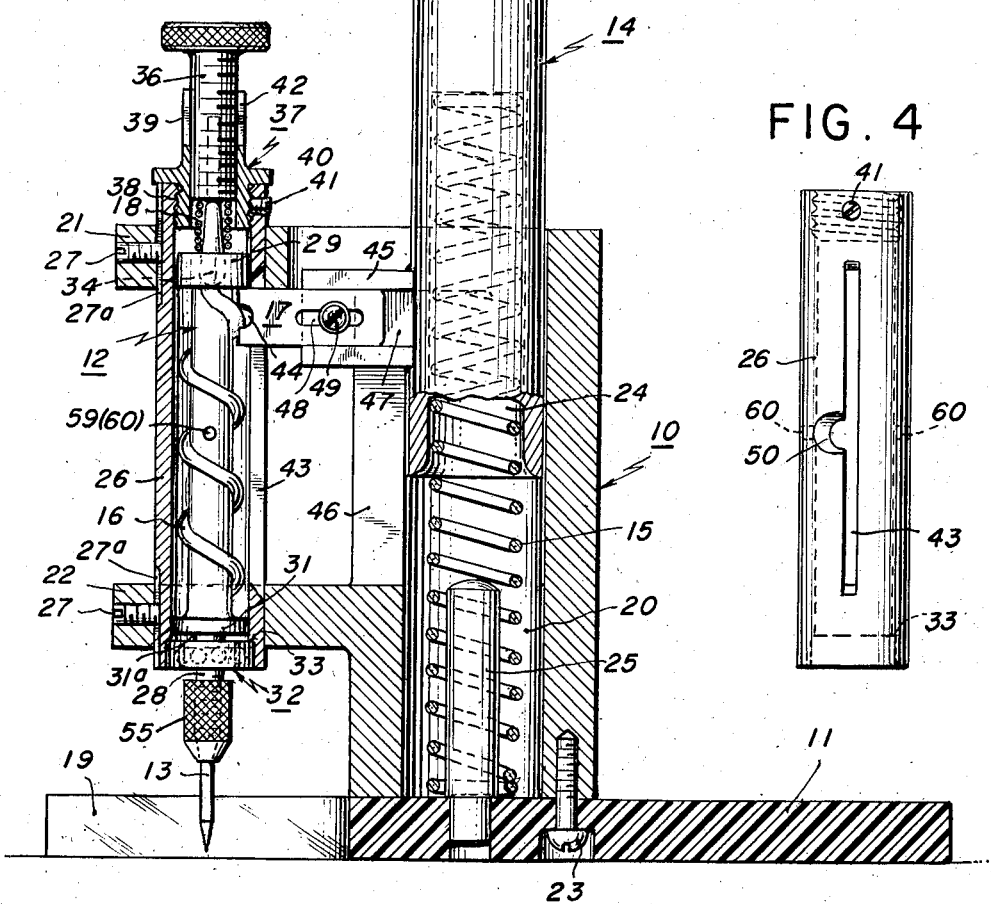
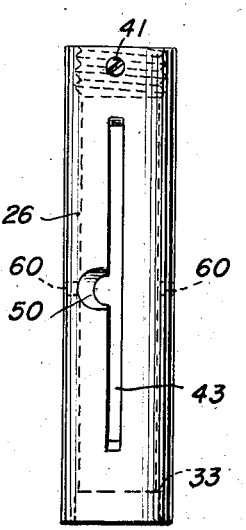
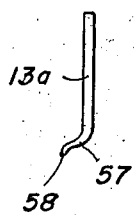
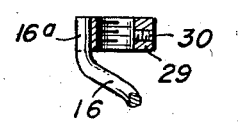
INVENTOR
EUGENE F. MAY
ATTORNEYS United States Patent Office 2,825,136
Patented Mar. 4, 1958

2,825,136

SCRIBING INSTRUMENT FOR MAP MAKING

Eugene F. May, Beltsville, Md.

Application December 30, 1955, Serial No. 556,594

15 Claims. (Cl. 33—27)

This invention relates to tools or instruments used in making maps by a relatively new technique called map scribing, or scriving as it is sometimes called. The old method of pen and ink drafting is being rapidly replaced by this new map scribing technique in the art of producing separation drawings for multicolored maps. The new method employed is to photograph the compilation image onto a sheet of polished transparent plastic that has been coated on one side with a paint-like material which may be scraped off as desired with specially developed scribing instruments. So, instead of inking in a stream or a road, etc., the line is cut in the coating material on the sheet. The use of this method results in greater speed of completing a map sheet, its uniformity of line work, simpler reproduction and shorter training periods of personnel.

With the development and adoption of this technique, a need has arisen for tools and instruments to fully exploit the possibilities and advantages of map scribing; and one such need was for an instrument which could cut circular dots or small circles rapidly and uniformly. Symbols made up partially or entirely of dots presented a bottleneck and a fatiguing job since each dot was cut in by hand. The present invention solves this problem since by actual test the operator of the instrument may scribe seven dots in the time required to "cut in" one dot by hand. The principal object of the invention is, therefore, to provide a hand tool or instrument by means of which the operator may cut circular dots or rings of uniform size very rapidly and without fatiguing effort.

The invention contemplates a body which may be slid by the hand of the operator over the coated surface of the plastic or glass sheet and which carries a perpendicular rotatable spindle with a chisel-like cutting point and means, under the control of the operator, for rotating the spindle so that the cutter in effect drills a hole through the coating to form the dot. In the preferred form of the invention, the body carries a movable finger piece actuated by a finger of the operator's hand to cause the rotation of the spindle and cutter, but other mechanical or electrical means may be provided to cause the rotation. More specifically, the finger piece may be a spring elevated plunger with a nut-like member coacting with a spiral thread on the spindle to cause the rotation as the plunger moves up and down; and in the preferred embodiment means are provided to lift the cutter point above the surface of the sheet just before the plunger reaches the end of its upward movement so that the instrument may be moved from place to place on the sheet without lifting the instrument. The invention further contemplates adjustable means for regulating the degree of downward movement of the spindle and its cutter and hence the depth of the cut made by the flat chisel-like point, the structure being such that there is a yielding pressure on the point at all times and it is moved downwardly by spring pressure until the limit of its downward movement is reached.

While the instrument is especially useful for cutting circular dots, and may be called a dotter, it may be used for cutting circular rings by laterally offsetting the cutting point from the axis of rotation of the spindle.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 3 is a vertical sectional view on an enlarged scale taken substantially on the line 3—3 in Fig. 2;

Fig. 4 is an enlarged side view of the spindle housing or barrel;

Fig. 9 is an enlarged view of a modified form of cutter for cutting circles or rings; and Fig. 10 is a detail section showing the connection of the spiral thread coil with its adjusting collar.

Figure 1:
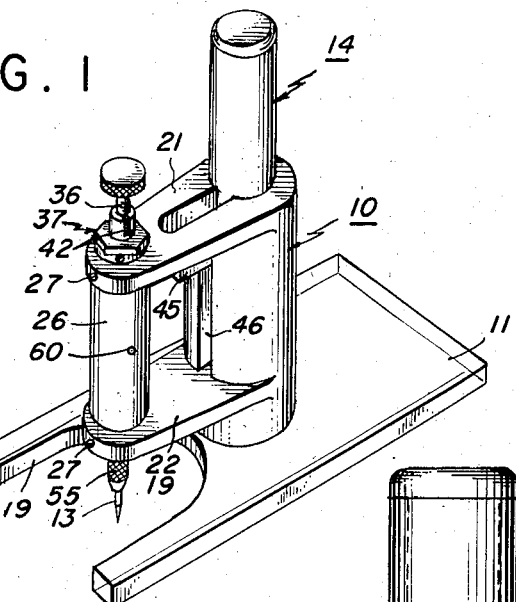
Fig. 1 is a perspective view of the instrument.

Referring more in detail to the drawings, the numeral 10 denotes, as a whole, the body of the tool mounted on a base 11 adapted to slide over the coated sheet. Supported by the body for rotation is an upright spindle 12 which carries at its lower end a cutter 13. The cutting point of the cutter is normally above but very close to the coated surface so that the instrument may slide over the surface without the point scratching it, but when the point is over the place where the dot or other cut is to be made, the cutter is lowered and rotated to cut through the coating whereupon the cutter is automatically raised to its elevated normal position. When the cutter is to be manually actuated, I preferably mount on the body a vertically movable finger piece 14 adapted to be depressed against the tension of a coil spring 15, and when it is depressed it causes rotation of the spindle 12. That may be done by providing on the spindle a spiral or screw-like element 16 which coacts with a nut-like member 17 carried by the finger piece. I may also utilize this screw and nut connection to automatically lower the cutter, at the beginning of each downward movement of the finger piece and to automatically raise the cutter upon the upward or return movement of the finger piece. I also preferably associate with the spindle spring means 18 to urge it downwardly throughout its limited sliding movement so that the cutter will be yieldingly pressed against the coating during the rotary cutting operation.

Figure 2:
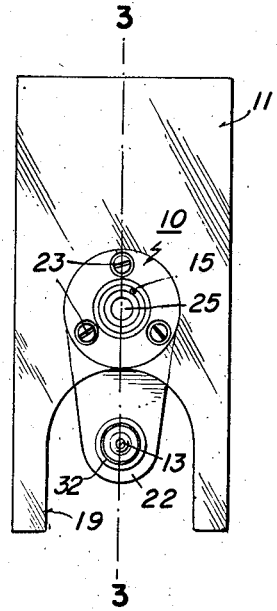
Fig. 2 is a full size bottom plan view.

While the structure for performing these functions may vary, the illustrated embodiment will now be specifically described. The base 11 may be a thick plate of transparent plastic of rectangular outline and from the center of which the body 10 rises. A U-shaped notch 19 is formed in the front end of the base to give an unobstructed view of the coated sheet beneath the cutter. The body 10 is preferably a brass casting having a tubular portion with a cylindrical bore 20 and with upper and lower radially projecting arms 21 and 22. The lower end of the tubular portion of the body 10 is fixed to the base 11 by a plurality of screws 23, as seen in Figs. 2 and 3. Slidable in the bore 20 is a cylindrical plunger which forms the finger piece 14. The lower end of the plunger has a bore 24 to receive the upper end of the coil spring 15, the lower end of the latter being centered in the bore 20 by a centering pin 25 suitably fixed in the base 11. The arm 21 is disposed at the top of the body 10 while the arm 22 is spaced above its lower end, and these arms are formed with alined circular openings to receive a cylindrical tube or barrel 26 which houses the spindle 12. Set screws 27 such as Allen screws are threaded through the ends of the arms and engage longitudinal flats 29a on the barrel to fix the latter in the arms in an adjustable manner.

Figure 5:
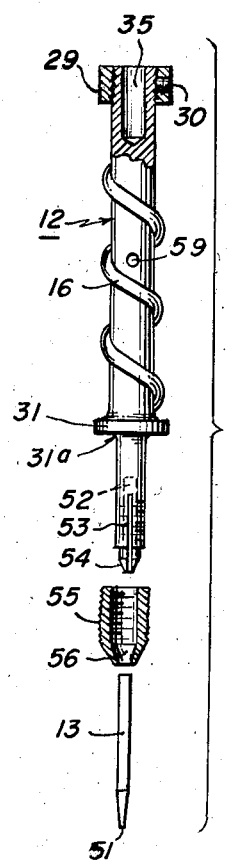
Fig. 5 is an exploded view on an enlarged scale partly in elevation and partly in section of the rotatable spindle and the dot cutter and its chuck.
Figure 6:
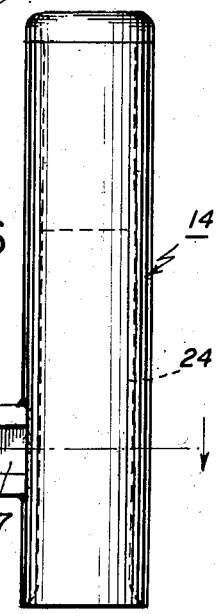
Fig. 6 is an enlarged side view of the finger piece or plunger showing the adjustable mounting of the nut member which coacts with the spiral or screw thread on the spindle.
Figure 7:
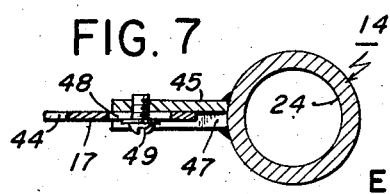
Fig. 7 is a detail section taken on line 7—7 in Fig. 6.
Figure 8:
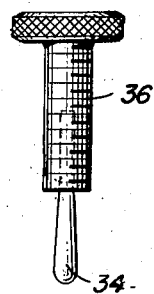
Fig. 8 is an enlarged side view of the adjusting screw and bearing pin for the upper end of the spindle.

The spindle 12 is in effect a screw shaft, and while it may have a coarse pitch screw thread cut in its cylindrical surface, the spiral 16 is preferably made of 1/16" drill rod or hardened tool steel shaped to form a spiral coil having 3 turns to the inch. It snugly surrounds and is fixed to the larger cylindrical portion of the spindle, the lower end 28 of which is reduced. The upper end of the coil or spiral 16 has a straight end 16a seated in a socket in a cylindrical collar 29 fixed by a set screw 30 on the upper end of the spindle. By reason of this construction the spiral coil may be adjusted circumferentially around the spindle. The lower end of the spiral thread 16 is disposed against a cylindrical stop collar 31 formed on or suitably fixed to the spindle at the upper end of its reduced portion 28. The collars 29 and 31 are of less diameter than the bore of the barrel or housing 26 and do not form bearings for the spindle. The bearing for the lower end of the spindle is a ball bearing unit 32 which is pressed in a slight enlargement of the lower end of the bore of the barrel and against a shoulder 33. The unit 32 is of well known form having an annular row of balls and a spacing cage between a stationary outer member and a tubular rotatable inner member. The cylindrical reduced end 28 of the spindle has a limited sliding movement in the inner member of the unit and that member limits the downward movement of the spindle when its top is engaged by a beveled or curved annular stop shoulder 31a formed at the juncture of the collar 31 with the part 28, as seen in Fig. 5. Thus when the spindle is rotated after it reaches the limit of its downward sliding, the inner member of the bearing rotates with it to reduce friction. The shoulder 31a is substantially cone-shaped so that the spindle will be held centered even if there is wear at the central opening of the inner rotatable member of the bearing 32 and of the shoulder 31a itself. The bearing for the upper end of the spindle is a pin 34 which projects into and has a sliding fit in a cylindrical bearing socket 35 in the top of the spindle. The bearing pin 34 has its upper end fixed in the lower end of an adjusting screw 36 threaded in a cap 37 at the top of the housing or barrel 26, as seen in Fig. 3. The cap 37 is preferably a tubular nut with external screw threads 38 at its lower end to engage threads in the upper end of the barrel and with a tubular upper portion 39 internally threaded to receive the threads of the pin-carrying screw 36. The enlarged intermediate portion 40 of the tubular cap nut has a flat faced outer edge to be engaged by a wrench so that it may be screwed tight against the upper end of the barrel. A set screw 41 in the portion of the barrel projecting above the arm 21 is adapted to lock the cap. The reduced tubular extension 39 of the cap in which the adjusting screw 36 is threaded, is preferably formed with a diametrically extending slit 42 so that tension may be placed on the threads of the screw by pressing the halves of the extension toward each other.

The nut member 17 which coacts with the screw thread or spiral 16, is a rectangular piece of tool steel disposed horizontally and carried by the plunger 14. It moves in a longitudinal slot 43 formed in the barrel 26 and has at its outer end a notch 44 shaped to receive the spiral rib 16. The plate or member 17 is detachably and adjustably mounted on an arm 45 projecting radially from the lower portion of the plunger 14 and adapted to move in a vertical slot 46 formed in cylindrical body 10 and extending through the upper arm 21, as seen in Fig. 3. The index or nut plate 17 is longitudinally slidable in a channel 47 formed in one side of the arm 45 and has a longitudinal slot 48 to receive a clamping screw 49 threaded into the arm 45. The latter may be welded to the plunger 14 which may be a piece of metal tube having its upper end closed by a headed plug against the lower end of which the spring 15 thrusts. A sight opening in the form of a transverse notch 50 may be formed in the barrel 26 on one side of its slot to expose a portion of the spiral 16 and thus facilitate the engagement of the notch 44 with the spiral in assembling the parts.

When the tool 13 is to cut dots it may be in the form of a phonograph needle with a cylindrical body or shank but with a cutting point that resembles a chisel, that is, it will be V-shaped when viewed in one direction but when viewed at right angles to that direction, the extremity will have length in thousandths of an inch. This straight or flat extremity 51 will extend transversely of the longitudinal axis of the shank and to the same distance on each side of that axis. The width of the cutting point will depend upon the size or diameter of the circular dot that is to be cut. Ordinary phonograph needles may be used as cutters by grinding their points to flat chisel-like ends, but since the dots to be cut or drilled in the coating vary in size from about .004" to .050" there is preferably used with the instrument a set of drills which have shanks with cylindrical portions of the same diameter as the socket 52 or to fit a suitable socket, while their lower portions are flat and vary in width in thousandths of an inch.

While the tool or point may be removably fastened to the end 28 of the spindle by inserting its shank in a socket and fastening it by a set screw, I preferably employ the clamping chuck shown in Figs. 3 and 5. The end 28 is formed with a socket 52 to receive the tool shank and it has a diametrical slit 53. It is externally screw threaded and at its extremity is a tapered or cone-shaped portion 54 so that the jaws formed by the slit will be clamped upon the tool shank when a tubular nut 55 with a coacting cone-shaped portion 56 is threaded on the end 28.

If it is desired to cut circular rings, a tool with an offset cutting point, such as shown in Fig. 9, may be used. This cutter 13a has a cylindrical shank with a laterally offset lower portion 57 carrying the cutting extremity 58. The size of the ring to be cut will determine the degree of offset and the width of the point 58 will determine the width or thickness of the circular line that is cut.

In order to facilitate the loosening and tightening of the chuck nut 55 when a tool or cutter is to be replaced on the spindle, I may lock the latter against rotation by providing in the spindle a diametrically extending hole 59 adapted to be alined with diametrically located holes 60 formed in the barrel, so that the straight portion of an Allen screw wrench may be passed through the holes 59, 60. When that is done the chuck nut may be readily loosened or tightened.

The coil spring 18 which exerts a downward pressure on the spindle 12, surrounds the bearing pin 34 and thrusts at its upper end against the bottom of the adjusting screw 36 and at its lower end against the top of the spindle, thus tending to force the latter downwardly in the barrel until the shoulder 31a at the bottom of the collar 31 engages the stop formed by the rotatable inner member of bearing 32. The coatings on the plastic or glass sheets vary in hardness and the screw 36 may be adjusted accordingly. The much stronger spring 15 lifts the plunger 14 until the index or nut plate 17 strikes the bottom of the arm 21, as seen in Fig. 3, but the spiral 16 is so arranged on the spindle that before the plunger reaches the limit of its upward movement, the spindle is slid vertically in its housing without rotation to put the spring 18 under further compression and to lift the collar 31 slightly away from the bearing 32 and hence lift the cutter above the coating. That may be done by providing a suitable stop on the spiral 16 or by the engagement of the nut plate 17 with the bottom of the collar 29, the latter forming a shoulder on the spindle. The thickness of the coating is small, about .002", and the cutting end of the tool need not be moved high above the coating to prevent the tool from scratching the latter when the instrument is slid over the sheet, and the limited sliding movement of the spindle may be provided for by using either the collar 29 or a stop lug on the spiral 16 as above noted. Just before the upward movement of the plunger is stopped by the engagement of the plate 17 with the arm 21, or by other means, the plate 17 will engage the collar 29 and bodily lift the spindle to lift the cutting point off of the coated sheet. The spring 18 will at all times maintain a downward pressure on the cutter so that it cuts through the coating while the spindle is rotated in either direction. The downward movement of the plunger may be limited by its arm 45 engaging the arm 22 of the body. The downward movement of the spindle in the barrel is limited by the bearing 32 but the extreme downward movement of the cutting end of the tool, that is, the depth of the cut, may be varied by vertically adjusting the spindle barrel 26 in the arms 21 and 22. That may be done by loosening the screws 27 and shifting the barrel in the arms. The provision of the grooves or flats 27a for the screws, prevents the other parts of the device from being thrown out of adjustment. This adjustment is also important when tools having standard lengths which fit a socket intended to receive them, are ground and thus shortened in length. The adjustment of the barrel permits such a shortened tool to have its ground end properly positioned on the spindle. The screw threading of the collar 29 on the top of the spindle not only permits the spiral 16 to be circumferentially adjusted around the spindle but enables it to be positioned, during the assembling of the parts, so that the spiral will not cover the hole 59 for the shank of an Allen screw wrench or other tool. The adjustment of the plate 17 on the arm 45 facilitates the assembly of the parts of the instrument and the proper engagement of the notch 44 with the spiral.

In cutting a dot it is only necessary to position the instrument on the sheet so that the engraving point is over the location of the dot and to then depress and release the finger piece. It is to be noted that merely a simple vertical movement of the finger will cause both the lowering of the cutter and its rotation, and hence no twisting movement of the hand, which might cause a shifting of the instrument on the coated sheet, is necessary. The instrument may thus be used to rapidly engrave uniform clear cut dot symbols and effects a great saving in time and effort where a large number of dots are used in such symbols as intermittent streams, dotted lines, and the like.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In an instrument for cutting dots or circles in the coating on a flat sheet, said instrument comprising in combination, a body slidable by the operator's hand while being supported on a coated sheet, an upright spindle having means at its lower end to hold a cutting tool, upper and lower bearings fixed to said body and directly supporting said spindle for rotation and for axial sliding movement, stop means limiting the downward sliding of the spindle, spring means normally urging said spindle downwardly, screw thread means on an intermediate portion of the spindle, a nut member mounted for vertical reciprocation on said body to one side of said spindle and coacting with said screw thread means for reversely rotating the spindle as the nut member is reciprocated, finger actuated means for moving said nut member downwardly, a fixed stop on said body to limit the upward movement of the nut member, spring means urging said nut member upwardly, and a shoulder on said spindle at the upper end of said screw thread means, said shoulder being engaged by said nut member during its upward movement and just prior to the end of the upward movement of the nut member, whereby the rotation of the spindle is stopped and the spindle is then slid upwardly to move its tool away from the coated sheet against the tension of said spring means acting on the spindle, and whereby when said nut member is moved downwardly the spindle is first permitted to slide downwardly to cause its tool to be spring pressed against the coating on the sheet and then rotated by the continued downward movement of the nut member.

2. An instrument as defined in claim 1 in which said finger actuated means for said nut member is a vertically slidable plunger which carries said nut member and which is actuated upwardly by the spring means urging the nut member upwardly.

3. An instrument as defined in claim 1 in which upper and lower bearings are carried by a housing in which said spindle is disposed and which is mounted for vertical sliding adjustment on said body, and means fixing said housing in an adjusted position to vary the extent of downward movement of the spindle depending upon the thickness of the coating on the sheet.

4. An instrument as defined in claim 3 in which said spring means normally urging said spindle downwardly is a coil spring in the upper portion of the housing and having its lower end thrusting against the top of the spindle, and in which said stop means limiting the downward movement of the spindle comprises a shoulder carried by the lower portion of the spindle and engageable with said lower bearing.

5. In an instrument of the character set forth having a body movable by the operator's hand while being slidably supported on a coated sheet, an upright spindle having means at its lower end to receive a cutting tool, means on the body supporting said spindle for rotation and for limited axial sliding movement, said means including a stop to limit the downward sliding of the spindle, spring means normally urging the spindle downwardly against said stop, a shoulder on the upper portion of the spindle, screw thread means on the intermediate portion of the spindle, a nut member mounted on the body for up and down reciprocation and coacting with said screw thread means to rotate the spindle and also coacting with said shoulder just prior to the end of its upward travel to slide the spindle upwardly and lift the tool out of engagement with the coated sheet, the tool being lowered into cutting engagement with the coating on the sheet at the beginning of the downward travel of the nut member by the action of said spring means on the spindle, and manually controlled means supported on the body to reciprocate said nut member, said means for supporting the spindle for rotary and sliding movement comprising a housing within which the spindle is disposed and which is mounted for vertical sliding adjustment on the body, and means fixing said housing in an adjusted position, to vary the extent of downward movement of the spindle depending upon the thickness of the coating on the sheet, said spring means for normally urging the spindle downwardly being a coil spring in the upper portion of the housing having its lower end thrusting against the top of the spindle, and an adjusting screw at the top of the housing against which the upper end of the coil spring thrusts.

6. In an instrument of the character set forth having an upright spindle carried by a body which is manually slidable on the coated surface of a flat sheet, said spindle having at its lower end means to receive a cutting tool whose cutting end is normally disposed above the coating, means mounting said spindle for rotation and for limited axial sliding movement, spring means associated with the spindle urging said spindle downwardly, and manually controlled means automatically actuating said spindle to first lower the spindle to permit said spring means to bring the tool into cutting engagement with the coating, then rotate the spindle in one direction while it is being urged downwardly by said spring means, then rotate the spindle in the opposite direction while it is still being urged downwardly by said spring means, and finally elevate the spindle against the tension of said spring means to lift the tool out of engagement with the coated sheet, said manually controlled means comprising a depressable, spring-elevated finger piece mounted on the body independently of and spaced laterally from the spindle, and spindle-moving means associated with said finger piece and with said spindle, whereby the depression and release of the finger piece will cause the said movements of the spindle, said finger piece being a vertically slidable plunger and said spindle moving means comprising screw thread means on the spindle and a nut member movable with the plunger and coacting with said screw thread means to rotate the spindle and also coacting with a shoulder on the spindle to lift the spindle against the tension of said spring means and to permit the latter to lower the spindle.

7. In an instrument of the character set forth having an upright spindle carried by a body which is manually slidable on the coated surface of a flat sheet, said spindle having at its lower end means to receive a cutting tool whose cutting end is normally disposed above the coating, means mounting said spindle for rotation and for limited axial sliding movement, spring means associated with the spindle urging said spindle downwardly, and manually controlled means automatically actuating said spindle to first lower the spindle to permit said spring means to bring the tool into cutting engagement with the coating, then rotate the spindle in one direction while it is being urged downwardly by said spring means, then rotate the spindle in the opposite direction while it is still being urged downwardly by said spring means, and finally elevate the spindle against the tension of said spring means to lift the tool out of engagement with the coated sheet, said manually controlled means comprising a depressable, spring-elevated finger piece mounted on the body independently of and spaced laterally from the spindle, and spindle-moving means associated with said finger piece and with said spindle, whereby the depression and release of the finger piece will cause the said movements of the spindle, said means for mounting said spindle for rotation and limited axial movement comprising a housing around said spindle, an apertured stop bearing at the lower end of the housing, said spindle having at its lower end a reduced portion extending through the aperture of said bearing, and a substantially cone-shaped stop portion at the top of the reduced lower end of the spindle to coact with said stop bearing to keep the spindle centered.

8. In an instrument of the character set forth having an upright spindle carried by a body which is manually slidable on the coated surface of a flat sheet, said spindle having at its lower end means to receive a cutting tool whose cutting end is normally disposed above the coating, means mounting said spindle for rotation and for limited axial sliding movement, spring means associated with the spindle urging said spindle downwardly, and manually controlled means automatically actuating said spindle to first lower the spindle to permit said spring means to bring the tool into cutting engagement with the coating, then rotate the spindle in one direction while it is being urged downwardly by said spring means, then rotate the spindle in the opposite direction while it is still being urged downwardly by said spring means, and finally elevate the spindle against the tension of said spring means to lift the tool out of engagement with the coated sheet, said manually controlled means comprising a depressable, spring-elevated finger piece mounted on the body independently of and spaced laterally from the spindle, and spindle-moving means associated with said finger piece and with said spindle, whereby the depression and release of the finger piece will cause the said movements of the spindle, and a cutting tool on said receiving means at the lower end of the spindle, said tool having a flat chisel-shaped cutting end to cut circular dots.

9. In an instrument of the character set forth having an upright spindle carried by a body which is manually slidable on the coated surface of a flat sheet, said spindle having at its lower end means to receive a cutting tool whose cutting end is normally disposed above the coating, means mounting said spindle for rotation and for limited axial sliding movement, spring means associated with the spindle urging said spindle downwardly, and manually controlled means automatically actuating said spinde to first lower the spindle to permit said spring means to bring the tool into cutting engagement with the coating, then rotate the spindle in one direction while it is being urged downwardly by said spring means, then rotate the spindle in the opposite direction while it is still being urged downwardly by said spring means, and finally elevate the spindle against the tension of said spring means to lift the tool out of engagement with the coated sheet, said manually controlled means comprising a depressable, spring-elevated finger piece mounted on the body independently of and spaced laterally from the spindle, and spindle-moving means associated with said finger piece and with said spindle, whereby the depression and release of the finger piece will cause the said movements of the spindle, and a cutting tool on said receiving means at the lower end of the spindle, said tool having a laterally offset cutting end to cut circular rings.

10. In an instrument of the character set forth, the combination of a body to be moved over a coated sheet by the hand while supported on the coating, an upright rotary spindle having a screw thread and a reduced lower end forming an annular shoulder, means at the lower end of the spindle to receive a cutting tool with a cutting end normally disposed above the coating on the sheet, an upright tubular housing around the spindle and mounted on the body and having an upright slot, a bearing at the lower end of the housing to slidably and rotatively receive the reduced end of the spindle and to be engaged by said shoulder to limit the downward movement of the spindle in the housing, bearing means at the top of the housing to slidably and rotatively support the upper end of the spindle, a vertically reciprocating finger piece mounted on the body to one side of said slot in the housing, a nut member carried by said finger piece and movable in said slot to coact with said screw thread on the spindle, spring means to elevate said finger piece, stop means to limit the reciprocatory movement of the finger piece and spring means at the top of the housing to urge the spindle downwardly.

11. The structure of claim 10 in which said housing is slidably adjustable on the body to limit the extreme downward movement of the cutting end of the cutter.

12. The structure of claim 10 in which said body has an upright vertically slotted cylindrical tubular portion supported on a base, and upper and lower radially projecting arms in which said spindle housing is mounted with its slot facing the slot in said tubular portion, and in which said finger piece is a cylindrical plunger movable in the bore of said tubular portion, said plunger having a radially projecting arm projecting through the slot in said tubular portion and carrying said nut member.

13. The structure of claim 10 in which said bearing means at the top of the spindle comprises a tubular cap on the upper end of said housing and having a threaded bore, an adjustable screw in said bore, a bearing pin carried by said screw and having a sliding fit in a cylindrical bearing socket in the upper end of the spindle, and said spring means at the top of the housing being a coil spring surrounding said bearing pin and thrusting at one end against said adjustable screw and at its other end against the top of the spindle.

14. The structure of claim 10 in which said screw thread is a spiral rod on a cylindrical portion of the spindle and said nut member includes a plate having a notch to receive the spiral rod.

15. The structure of claim 14 in which said spiral rod has one end fixed to a collar adjustable around the cylindrical portion of the spindle, and in which the latter and said housing have diametrically arranged holes to receive a tool to hold the spindle against rotation.

References Cited in the file of this patent

UNITED STATES PATENTS

| | | |
|---|---|---|
| 1,058,654 | Barber | Apr. 8, 1913 |
| 2,214,666 | Elf | Sept. 10, 1940 |
| 2,449,108 | Carlock | Sept. 14, 1948 |
| 2,525,828 | Rice | Oct. 17, 1950 |
| 2,576,291 | Fletcher | Nov. 27, 1951 |
| 2,734,272 | Brown | Feb. 14, 1956 |
| 2,735,190 | Jordan et al. | Feb. 21, 1956 |